United States Patent [19]

Jespersen et al.

[11] 4,038,426

[45] July 26, 1977

[54] PROCESS FOR PICKLING MEAT SECTIONS

[76] Inventors: Knud Jespersen, R.R. No. 1, Terracotta, Ontario; Theodore Edgar Engman, 429 58th Avenue South East, Calgary, Alberta, both of Canada

[21] Appl. No.: 648,575

[22] Filed: Jan. 12, 1976

Related U.S. Application Data

[63] Continuation-in-part of Ser. No. 562,474, March 27, 1975, abandoned.

[51] Int. Cl.$^2$ .............................................. A23B 4/02
[52] U.S. Cl. ................................... 426/266; 426/281; 426/332; 426/641; 426/519
[58] Field of Search ............... 426/281, 532, 641, 645, 426/265, 266, 332, 519

[56] References Cited

U.S. PATENT DOCUMENTS

| 3,775,134 | 11/1973 | Michels et al. | 426/281 |
| 3,928,634 | 12/1975 | Gasbarro | 426/281 |

FOREIGN PATENT DOCUMENTS

1,465,421  12/1966  France

*Primary Examiner*—Raymond N. Jones
*Assistant Examiner*—Esther L. Massung

[57] ABSTRACT

A process for pickling meat sections such as briskets, hams, picnics and the like comprising the steps of injecting meat sections with a liquid pickling medium, placing the meat sections in a container with additional liquid pickling medium continuously slowly rotating a stirring member within a part of said container while leaving other parts thereof free of such stirring thereby subjecting some said meat sections to direct stirring action by contact with said stirring member in said one part of said container while other meat sections in another part of said container are out of contact with said stirring member and continuing said stirring action until substantially all said additional pickling medium is absorbed by said meat sections, and gradually reducing the stirring speed towards the end of the stirring periods, as the viscosity of the contents of the container increases.

3 Claims, 4 Drawing Figures

PROCESS FOR PICKLING MEAT SECTIONS

This application is a Continuation-In-Part of application Ser. No. 562,474 filed Mar. 27, 1975, entitled "Process for Pickling Meat Sections" now abandoned.

The present invention relates to a process for pickling meat sections in liquids such as brine mixtures, pickling mixtures and the like, and is particularly designed for the pickling of briskets, hams, picnics, and the like.

BACKGROUND OF THE INVENTION

The soaking or pickling of meat sections in the past has usually been carried out by simply filling a tank or vat with a suitable liquid or pickling mixture and immersing meat sections therein. Recently however, various different proposals have been made for speeding up the process and rendering it somewhat more economical, and also achieving a somewhat deeper penetration of the pickling mixture into the meat. Such proposals have included proposals for tumbling the meat sections by rotating or moving a tank, and also for applying either pressure or a vacuum to such a tank. Generally speaking, however, the apparatus proposed for these different purposes has been unduly complex and expensive. It must be borne in mind that the pickling of meat products is carried over a relatively lengthy cycle, up to 24 hours or more in some cases. To achieve any worthwhile volume in production, it is, therefore, necessary to have a very large number of such tanks or other equipment, each of which will be processing only a single batch of meat sections during such 24 hour period.

Such improved processes have been unduly complex, however, and have often resulted in a certain degree of marking of the exterior of the meat sections. In the majority of cases the meat is first of all de-bonded and de-fatted and is cut up into sections or chunks and then pickled. After pickling is completed, the pickled meat sections are then stuffed into casings, or molds and cooked or smoked. It is of course desirable that the cooked chunks of meat will adhere together so that in use they can be sliced up and served. In practice, however, it is found that they separate relatively easily.

In addition it was always the practice to speed up the pickling by injection of the pickling mixture into the meat as a preliminary step. This left undesirable markings in the meat which made it less attractive when served.

It is, therefore, desirable to provide a process for pickling, without damaging of the meat sections, and which results in greater adhesion of the meat sections in the final smoked and cooked product and which reduces the marking of the meat by injection.

The cost of the equipment used for the process is a principal factor in its design since in a meat processing factory of any size at all, relatively large numbers of such tanks must be provided. Accordingly, the process should preferably be capable of being carried out in relatively simple inexpensive machinery.

In addition to these principal factors, equipment must of course be as effective as possible for the purpose. In the case of the present invention, it has been found that the meat sections such as briskets, hams, picnics or the like may advantageously be subjected to a continuous gentle massaging effect which does not only merely agitate the liquid, but actually subjects the meat itself to a crude form of massaging partly by direct contact with the meat sections, and partly by massaging action between the meat sections themselves. This produces a much greater and more rapid penetration of the liquid into the meat than would otherwise be the case. The design of the apparatus for this purpose must, therefore, be such that while being economical to build, and simple to clean and service, it must also be such as to provide an effective massaging action for the greastest penetration of liquid into the meat.

Tumbling or stirring of meat sections has been proposed. However, such processes tended to cause excessive tissue damage, for reasons which were not entirely understood. It is therefore desirable to avoid such damage which is regarded as unacceptable to consumers.

BRIEF SUMMARY OF THE INVENTION

The invention, therefore, seeks to provide a process for pickling meat sections such as briskets, hams, picnics and the like comprising the steps of injecting meat sections which have been de-boned and de-fatted in the usual way with a liquid pickling medium, placing them in a container with further liquid pickling medium, slowly rotating a stirring member in a part of said container while leaving other parts thereof free of such stirring thereby subjecting some said meat sections to direct stirring action by contact with said stirring member in said one part of said container while other said meat sections in said other parts of said container are out of contact with said stirring member and continuing said stirring action until substantially all said further pickling medium is absorbed by said meat sections, the stirring speed being progressively reduced towards the end of the period as the contents of the container becomes more and more viscous. In this way, improved binding of the meat sections is achieved, with a reduction in tissue damage. The process of the invention is preferably carried out by means of apparatus which comprises a generally square shaped container in plan having flat side and bottom walls and radiussed corners, and an open top, and of predetermined width and height dimensions, a central shaft extending down the central axis of such container, stirrer arms extending at right angles from said central shaft, each stirring arm having an effective length extending to slightly less than one half of the width dimension of the container, a support beam member extending from side to side of said container above its open top, fastening means for fastening said beam releasably in position on said open top of said container, and variable speed, preferably hydraulically operated, drive means mounted on said beam from driving said central shaft, releasing of said fastening means permitting removal of said drive means, beam, shaft and stirring arms as a single unit from said container.

More particularly, the invention provides a process having the foregoing advantages in which the drive means is maintained in operation at a constant torque. The viscosity of the contents of the container increases, after some hours of stirring and thus the load on the drive means increases. This will automatically produce a progressive decrease in rotational speed, towards the end of the stirring period.

Preferred rotational speeds will be in the range of 4 to 18 revolutions per minute at the beginning of the cycle, reducing to between 1 and 4 r.p.m. at the end. Setting of the initial r.p.m. will regulate the initial torque delivered by the drive means, and this is maintained constant throughout the cycle.

DESCRIPTION OF A SPECIFIC EMBODIMENT

For the sake of simplicity the apparatus for carrying out the process according to the invention will be described first.

Figure 1:
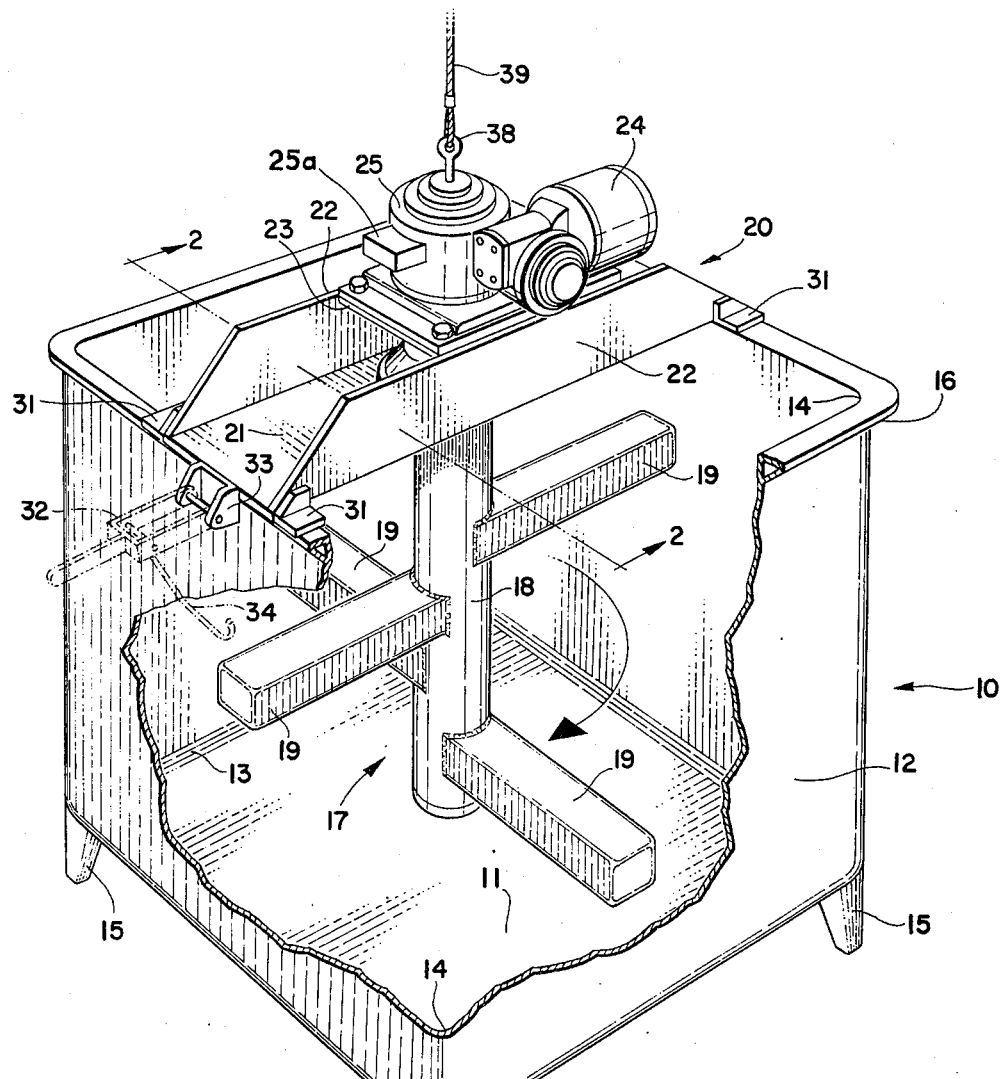
FIG. 1 is a side elevational view showing a tank for processing meat sections according to the invention partially in section.
Figure 2:
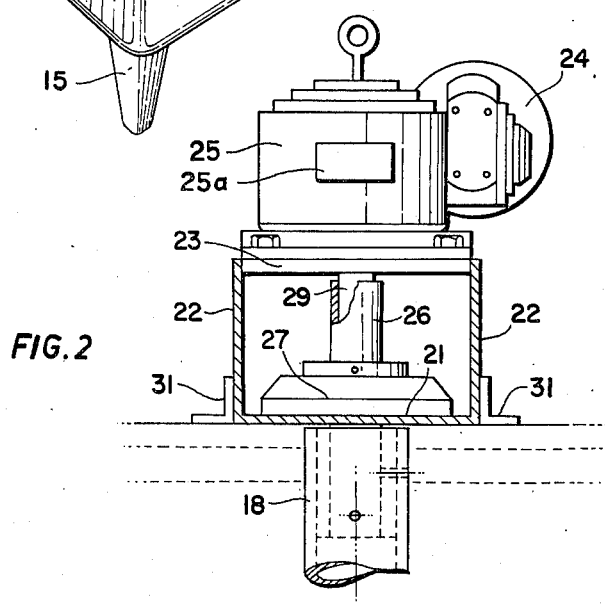
FIG. 2 is an enlarged detailed view shown partially in section along the line 2—2 of FIG. 1.
Figure 4:
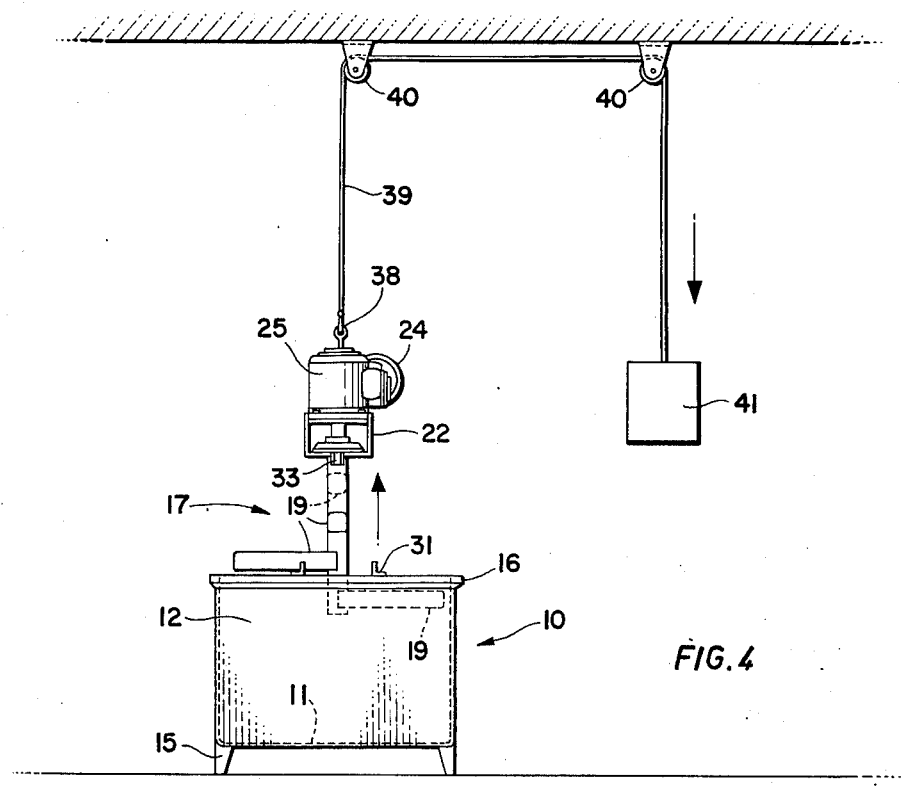
Figure 3:
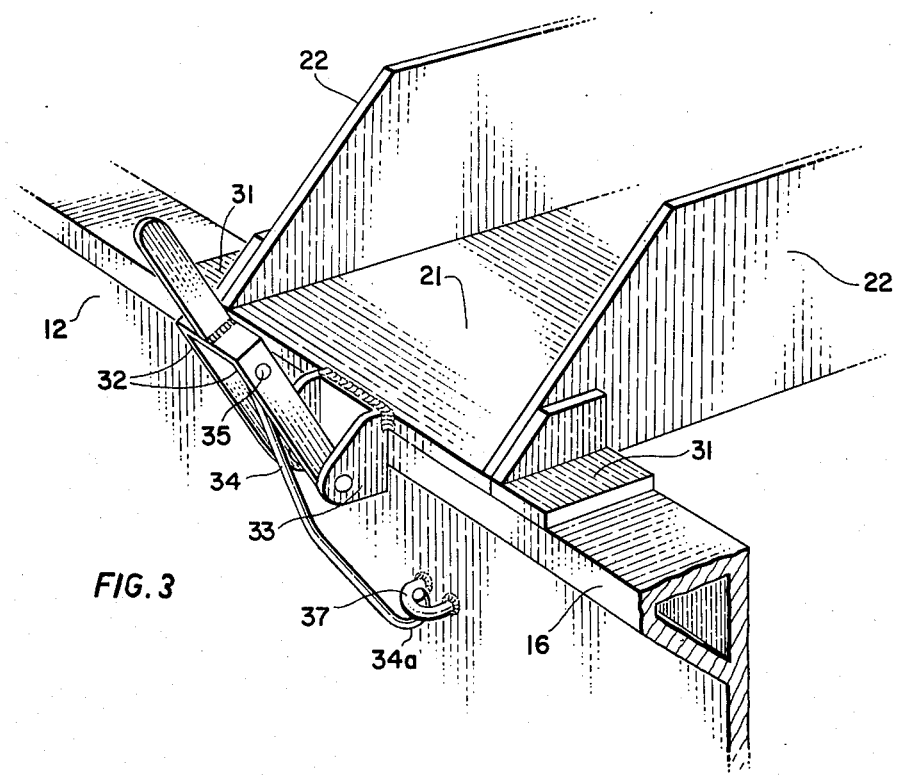
FIG. 3 is a perspective illustration of a portion of the embodiment of FIG. 1, and, FIG. 4 is a schematic side elevational view of such a tank installed in position, and showing hoisting apparatus for removal of the power operated stirring means from within the tank.

Referring now to FIGS. 1, 2 and 3 it will be seen that this preferred embodiment of the apparatus comprises a tank or container shown generally as 10, and having a generally flat bottom 11, and four generally planar flat sides 12. The sides 12 meet the bottom 11 at generally rounded or radiussed corners 13, and the four sides 12 meet one another at similar generally rounded or radiussed corners 14. Legs 15 are attached to the bottom 11 for supporting the container 10 in a position on the floor. The shape of the container is generally square in plan.

Preferably, the container 10 is provided around the upper edges of the side walls 12, with a hollow reinforced rim portion 16.

The stirring unit is shown by the general reference arrow 17, and comprises the generally cylindrical shaped drive shaft 18, which is of hollow tubular construction, and open at its upper end and closed at its lower end. Four generally rectangular stirring arms 19 are attached to the drive shaft 18, being recessed therein at spaced intervals. The arms 19 are of hollow rectangular construction, and closed at their outer ends. The arms 19 extend from four different sides of the drive shaft 18 as shown, and vertically spaced apart from one another by a distance which is slightly less than the width of a said arm 19.

The drive shaft 18 is supported in position in the tank or container 10 by means of the transverse cross beam 20. The cross beam 20 is of rectangular box-like construction, having a bottom wall 21, side walls 22 and a top wall portion 23. The support beam 20 is open at both ends for ease of servicing.

An hydraulic drive motor 24, which may drive through a reduction gear 25, is mounted on top of the top wall portion 23. A drive connecting shaft 26 is rotatably mounted in the bearing 27 which is supported on the bottom wall 21 of the cross member 20. At its lower end, the drive connecting shaft 26 passes into the hollow upper end of the drive shaft 18, and is fastened in position by any suitable securing means (not shown). At its upper end, the drive connecting shaft 26 which is itself hollow, fits around the shaft 29 extending from the reduction gear 25 or motor 24 (if the reduction gear 25 is not required), and suitable securing means (not shown) secure the shaft 26 as shown.

The motor 24 essentially converts hydraulic power into rotation. A given hydraulic pressure will exert a given amount of torque on the shaft 26. Provided the pressure is maintained constant then as the viscosity of the contents of the container increases, thus increasing the load, the speed of rotation will gradually decrease, as is described below.

The entire stirring unit 17 may be handled as a single unit, and yet may be readily disassembled for servicing or repair or cleaning with a minimum of difficulty.

In order to hold the transverse beam 20 in position on the reinforcing rim 16 of the container 10, there are provided pairs of angle members 31 which are welded in position on the rim 16, and are adapted to receive between them the two ends of the beam 20 and thereby secure the same against possible movement in reaction to the action of the motor 24.

In order to hold the beam 20 firmly in position, a pair of toggle clamps is provided, one at each end of the beam 20, and such toggle clamps will be seen to comprise the handle portions 32 pivotally mounted on the mounting flanges 33 which are welded to the reinforcing rim 16, between the two angle members 31. A locking rod member 34 is pivotally mounted within the handle 32 as at 35, and is provided with a hook member at its free end. A D-shaped lug member 37 is welded to the outside of the side wall 12, and the hook member 36 may be interlocked with the lug 37 as shown, and operation of the handle 32 will provide a tight clamping action.

This is only one form of holding means which is described by way of example.

In order to hoist the entire stirring unit 17 out of the container 10, a ring 38 is provided on top of the motor 24, and a cable 39 is connected to the ring 38 for hoisting the unit. The cable 39 may be connected to any suitable simple form of hoisting means such as the pulleys 40, and a counterweight 41 is provided on the other end of the cable 39. In this way, once the clamping means 36 is released from the lugs 37, an operator can by simply controlling movement of the counterweight permit the entire stirring unit 17 to rise upwardly against the pulley 40.

The process according to the invention takes place as follows. Meat selected for pickling is first of all deboned and de-fatted and skinned, and prepared in accordance with well known practice. It is then cut up into chunks or sections. The meat chunks or sections are then injected with a quantity of brine or liquid pickling medium. A suitable further quantity of pickling liquid is then placed in container 10. These quantities will be accurately measured, and will be based upon the weight of the meat sections to be pickled in that particular container. This is to ensure that the right total quantity of pickling medium is absorbed by the meat sections during the process.

The stirring unit 17 is then started up, and it commences slow, continuous rotation within the container 10. Generally speaking, this will be somewhere between about four and eighteen revolutions per minute depending upon the particular meat chunks or sections, and the nature of the pickling operation. Slower speeds will usually be used for larger size chunks of meat, and higher speeds may be used with smaller pieces. The selection of the r.p.m. at the beginning of the process cycle will depend largely on the experience of the individual in charge. In general, however, the speed of rotation of the stirring unit 17 will be selected so as to ensure that the meat chunks or sections within the container 10 are subjected to a gentle massaging action.

Such an action takes place naturally, provided a suitable speed of rotation has been selected, due to the configuration of the square tank and the stirring unit 17. Clearly, the stirring arms 19 will describe a circular path within the square-shaped container 10. Thus, while some of the meat sections will be brushed by the stirring arms 19, others will slide to one side into the more or less triangular corners of the container 10 which are not traversed by the stirring arms 19. These meat sections will, however, be moved out of the corners once more by movement of other meat sections, and in fact they will be found to revolve continuously into and out of the path of one or other of the stirring arms 19. In some cases, the meat sections will be moved upwardly through the tank and then downwardly once more, and in other cases they will move out into the corners and then back into the centre of the tank. In any event, however, such movement does not result in bruising or damaging of the meat itself, but rather produces a rubbing or massaging action between one meat section and the next which results in a very much more rapid penetration of the pickling mixture into the meat than would otherwise be the case. The stirring direction may be reversed from time to time if desired, for example at hourly intervals.

As this action is continued, the meat sections will take up more and more of the brine or other pickling liquid and the contents of the tank will gradually become more solid, and require a greater stirring effort. The gentle massaging action which is achieved during the process causes the meat to exude a certain proportion of water soluble protein mass. Some of this protein mass remains on the surface of the chunks of meat, but a certain quantity of the protein will escape from the meat altogether and become suspended in the pickling liquid.

As the process is continued, and the quantity of pickling liquid becomes less, the proportion of protein becomes greater. Such protein mass is in fact highly viscous, and as a result the effort required to continue the stirring action becomes much greater.

According to the invention, it is found that a greatly improved result can be obtained at or about this stage in the process by gradually reducing the speed of rotation as viscosity of the contents of the container increases and the effort required for rotation thus becomes greater. As this slower rotation is continued, it is found that the protein which would otherwise have been lost from the meat sections altogether, is then reabsorbed. The process is complete when there is substantially no pickling liquid or protein left in the container.

The self regulation of the speed of rotation by the hydraulic motor 24, to suit the particular stage of the process and the particular degree of absorption of pickling liquid may be variable dependent upon the types and quality of different meats being processed and the amount of pickling liquid to be absorbed by the meat, and is essentially determined by the increasing viscosity of the contents of the container.

As explained, such speed control will take place simply by the use of a hydraulic motor 24 which may or may not be coupled through a gear box, simply by maintaining the pressure of the hydraulic power supply constant, as a result of which the speed of rotation will reduce as the load is increased.

It is found that at the completion of the cycle, the protein forms a congealed layer around the chunks of meat which binds them together.

The pickled mass of meat sections is then processed further in accordance with standard industry techniques. Usually they are packed in casings. Such casings are of many types. In some cases they are simply tubular stockinette material or tubular porous synthetic material. In other cases metal casings are used, and many different types are available, (eg. the Mepaco (trade mark) line of casings).

The casings, packed or stuffed with meat chunks, are then cooked and/or smoked in accordance with well known practice. Cooking and/or smoking causes the protein between the meat sections to set and it acts as a bonding agent holding the chunks together, and it also forms a strong exterior skin.

Previously, much of the protein mass was lost, and was not therefore available for binding the meat sections. Accordingly the end product was often only loosely bonded together and broke up when sliced.

When processed according to the invention however, the chunks of meat are found to be firmly bonded so that they may be readily sliced, and the exterior skin of dried protein further assists in effectively holding such chunks of meat together.

The end product is, therefore, possessed of a firmer and hence more attractive appearance, and hence has a greater appeal to the public.

Furthermore, in many cases, it is found that the process according to the invention may often reduce markings resulting from injection of the brine or other pickling liquid into the meat sections. Injection speeds up the introduction of the pickling mixture into the meat, but leaves marks in the meat which impair its appearance. By the practise of the invention, therefore, it is possible in many cases to produce an improved product without such marking being so noticeable.

The texture and quality of the meat may also be somewhat improved by such action, and meat treated in this way may be found to be somewhat more tender as a result.

The flat wide surfaces presented by the stirring arms 19 are sufficiently extensive in relation to the size of the meat sections that bruising and damage will not arise.

The regulation of the speed of rotation, to suit the particular stage of the process and the particular degree of absorption of pickling liquid may be variable dependent upon the types and quality of the different meats being processed and the amount of pickling liquid to be absorbed by the meat, and is, essentially, to be determined with reference to the increasing viscosity of the liquid in the container.

If necessary, such a speed variation can be achieved by the use of a variable speed gear reduction box 25 and a drive motor 24. However, this would normally require manual control of the variable speed gear reduction box which might prove to be unnecessarily expensive or inaccurate. It is, therefore, preferable that such speed regulation should take place automatically. Such automatic regulation may conceivably be achieved by the use of any suitable load sensing device such as a torque strain sensor, controlling the gear box 25 as described above.

Alternatively, it would be possible to employ a constant torque electric motor such as is well known in the art (eg. The Dynamatic Ajusto-Spede (trade mark) in which the shaft speed will gradually reduce as the viscosity increases.

However, preferably such speed control will take place simply by the use of a hydraulic motor 24 which may or may not be coupled through a gear box, simply by maintaining the pressure of the hydraulic power supply constant, as a result of which the speed of rotation will reduce as the increase in viscosity causes the stirring effort or load to increase.

In addition, suitable electrical or hydraulic controls and timers (not shown) may be provided to procure forward and reverse rotation, changing over automatically at predetermined periods, if such is desired, although it is not always necessary.

The make-up of the actual pickling mixture may vary widely. Typical mixtures are described in "Processed Meats" by W. E. Kramlich, A. M. Pearson and F. W. Tauber, The Avi Publishing Co. Inc., Westport, Connecticut 1973.

In many cases meat processors will develop their own recipies which may be confidential. In the following examples no details of the actual make-up of the pickle or brine are therefore given, since it is a matter of choice and taste.

EXAMPLE 1

A product was desired to gain in weight exactly 25 percent through the even absorption of curing salts dispersed in water and referred to as the injection pickle.

TABLE

| | |
|---|---|
| De-boned, de-fatted, skinned fresh ham pieces of medium size | 1394.0 lbs. |
| Pickle added by injector needle equipment | 254.0 lbs. |
| Pickle added to the container | 95.5 lbs. |
| TOTAL INTENDED GAIN | 349.5 lbs. |
| Meats and pickle to container | 1743.5 lbs. |
| Cured meats from container | 1743.0 lbs. for 25.0 percent gain |

Continuous agitation was commenced at 8 r.p.m. for about 15.0 hours the direction being reversed hourly.

It was noted that a mass of protein was gradually exuded from the meat sections, while the volume of pickle in the container decreased. This caused an increase in viscosity in the container and the speed of rotation progressively reduced over a period of about 1 hour at about 2 r.p.m. Rotation was then discontinued and the congealed mass of meat sections was removed, leaving the container substantially empty. The cured meat sections were then processed in the usual way by stuffing in casings and cooking. The end product was found to be firmly bound, and to have a tough exterior protein skin and sliced well without breaking up.

EXAMPLE 2

A product was desired to gain in weight exactly 38 percent of the fresh weight through the even absorption of injection pickle.

TABLE

| | |
|---|---|
| De-boned, de-fatted, skinned fresh ham chunks of larger size | 1100.0 lbs. |
| Pickle added by injector needle equipment | 390.0 lbs. |
| Pickle added to the container | 28.0 lbs. |
| TOTAL INTENDED GAIN | 418.0 lbs. |
| Meat and pickle to container | 1518.0 lbs. |
| Cured meats from cure container | 1518.0 lbs. for 38.0 percent gain |

Continuous agitation was commenced at 4 r.p.m. for about 30.0 hours the direction being reversed at various intervals. The meat chunks exuded protein, and absorbed the pickle. Towards the end of the period this increased the viscosity of the contents of the container, and the speed of rotation progressively reduced over a period of about 1½ hours to about 1 r.p.m. Rotation was then discontinued and the contents processed in the usual way as before. The end product was found to be firmly bound and to be tender and of good texture and colour, with only minor marking. It possessed a strong protein skin, and sliced easily without breaking up.

EXAMPLE 3

Example 1 was repeated using skinned, de-boned, de-fatted beef briskets in small size sections, with similar weights of pickle and meat. Rotation was set initially at about 18 r.p.m. and viscosity increased after about 15 hours. The speed then gradually dropped to about 8 r.p.m. and was then discontinued.

The product was processed in the same way as before with similar satisfactory results.

A calculation was made that a volume of meats equal to an increase of 230 percent as compared with previous processes could be processed in the same area using the same space converted to the continuous agitated process. This is of particular significance since all such space is refrigerated and is therefore costly to erect and maintain and must be utilized in the most effective economical manner.

A typical pickling medium suitable for use in the above examples is available under the name Prag Powder 5-200 (trade mark) from Griffith Laboratories Inc., 120200 South Central, Alsip, Ill.

The foregoing is a description of a preferred embodiment of the invention which is given here by way of example only. The invention is not to be taken as limited to any of the specific features as described, but comprehends all such variations thereof as come within the scope the the appended claims.

What is claimed is:

1. A process for pickling meat sections selected from the group consisting of briskets, hams, or picnics, said meat sections being skinned de-bonded, and de-fatted portions thereof and being intended to absorb a predetermined quantity of a liquid pickling medium, and said process comprising the steps of;

injecting said meat sections with a first quantity of a liquid pickling medium, less than said predetermined quantity;

placing said meat sections in a container together with an additional quantity of said liquid pickling medium said first quantity, and said additional quantity of pickling medium together totalling substantially exactly the quantity of liquid pickling medium desired to be absorbed by said meat sections in the process;

continuously rotating a stirring member at a predetermined torque value sufficient to procure rotation of a speed of between four and eighteen revolutions per minute, within a central part of said container, while leaving other parts remote from the center free of such stirring, thereby subjecting some said meat sections to direct stirring action by contact with said stirring member in said central part of said container while other said meat sections in said other parts of said container are out of contact with said stirring member, and are subjected to movement of other meat sections, whereby to produce a continuous gentle massaging action on said meat sections, and a continual transfer of meat sections from said central portion of said container to said other portions, and back again, said gentle massaging action producing a gradual exudation of soluble protein material from said meat sections, and a gradual absorption of said further quantity of said pickling medium in said container by said meat sections, said exuded protein material rendering the contents of said container more viscous, and hence imposing a greater stirring load on said stirring member, and, reducing the speed of rotation of said stirring member gradually in response to the increasing viscosity of said contents, while maintaining said torque constant, and continuing stirring at progressively reducing speed until substantially all said further liquid pickling medium is absorbed by said meat sections, and until said protein material is combined with said meat sections into a substantially homogeneous mass.

2. A process as claimed in claim 1 wherein said speed of rotation is initially set at between ten and eighteen r.p.m. and wherein said speed reduces progressively in response to increased viscosity of said meat sections, to between four and six r.p.m.

3. A process as claimed in claim 1 wherein the speed of rotation is initially set at between about four and eight r.p.m. and reduced progressively to between one to three r.p.m.

* * * * *